US012638619B2

(12) United States Patent
Chen et al.

(10) Patent No.: US 12,638,619 B2
(45) Date of Patent: May 26, 2026

(54) POLARIZER AND DISPLAY DEVICE

(71) Applicant: TCL CHINA STAR OPTOELECTRONICS TECHNOLOGY CO., LTD., Shenzhen (CN)

(72) Inventors: Kai Chen, Shenzhen (CN); Ji Li, Shenzhen (CN); Fang Tan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 206 days.

(21) Appl. No.: 18/478,993

(22) Filed: Sep. 30, 2023

(65) Prior Publication Data

US 2024/0345296 A1     Oct. 17, 2024

Related U.S. Application Data

(63) Continuation of application No. PCT/CN2023/112877, filed on Aug. 14, 2023.

(30) Foreign Application Priority Data

Apr. 13, 2023     (CN) ......................... 202310393880.2

(51) Int. Cl.
G02B 5/02          (2006.01)
G02B 5/30          (2006.01)
G02F 1/1335        (2006.01)

(52) U.S. Cl.
CPC ......... G02B 5/0294 (2013.01); G02B 5/0242 (2013.01); G02B 5/3025 (2013.01); G02F 1/133528 (2013.01)

(58) Field of Classification Search
None
See application file for complete search history.

(56) References Cited

U.S. PATENT DOCUMENTS

| | | | |
|---|---|---|---|
| 2006/0014085 A1 | 1/2006 | Nakajima et al. | |
| 2007/0030417 A1 | 2/2007 | Kubo et al. | |
| 2023/0118043 A1* | 4/2023 | Hong ...................... | G02B 1/14 |
| | | | 359/483.01 |

FOREIGN PATENT DOCUMENTS

| | | | |
|---|---|---|---|
| CN | 1183433 A | 6/1998 | |
| CN | 101283298 A | 10/2008 | |

(Continued)

OTHER PUBLICATIONS

International Search Report in International application No. PCT/CN2023/112877,mailed on Jan. 12, 2024.

(Continued)

*Primary Examiner* — Phu Vu

(74) *Attorney, Agent, or Firm* — PV IP PC; Christopher S. Ruprecht; Wei Te Chung

(57)     ABSTRACT

Some embodiments of the present application disclose a polarizer and a display device, wherein the polarizer includes a polarizing layer, and a first optical functional layer on a side of the polarizing layer. The first optical functional layer includes a substrate and light-diffusing particles dispersed in the substrate. An average value of a difference between an orientation angle of an orthographic projection of a long axis of the light-diffusing particle in a first plane and an orientation angle of an absorption axis of the polarizing layer in the first plane is less than or equal to 5°.

19 Claims, 5 Drawing Sheets

100

107(103)
102a(102)          102b(102)
104
105
101
111
110
109

(56)        References Cited

FOREIGN PATENT DOCUMENTS

| CN | 102928901 | A  | 2/2013  |
|----|-----------|----|---------|
| CN | 103412355 | A  | 11/2013 |
| CN | 110579830 | A  | 12/2019 |
| CN | 115685429 | A  | 2/2023  |
| CN | 116107011 | A  | 5/2023  |
| JP | 2023016785 | A | 2/2023  |
| KR | 20200132658 | A | 11/2020 |
| KR | 20230015806 | A | 1/2023  |
| WO | 2022010179 | A1 | 1/2022  |
| WO | 2022209643 | A1 | 10/2022 |

OTHER PUBLICATIONS

Written Opinion of the International Search Authority in International application No. PCT/CN2023/112877,mailed on Jan. 12, 2024.

Chinese Office Action issued in corresponding Chinese Patent Application No. 202310393880.2 dated Jun. 3, 2023, pp. 1-7.

Chinese Office Action issued in corresponding Chinese Patent Application No. 202310393880.2 dated May 13, 2023, pp. 1-7.

Japanese Office Action issued in corresponding Japanese Patent Application No. 特願2024-551965 dated Nov. 4, 2025, pp. 1-5.

Korean Office Action issued in corresponding Korean Patent Application No. 10-2024-7027279 dated Mar. 20, 2026, pp. 1-9.

* cited by examiner 100
107(103)
102a(102)
104
105
101
111
110
109
102b(102)
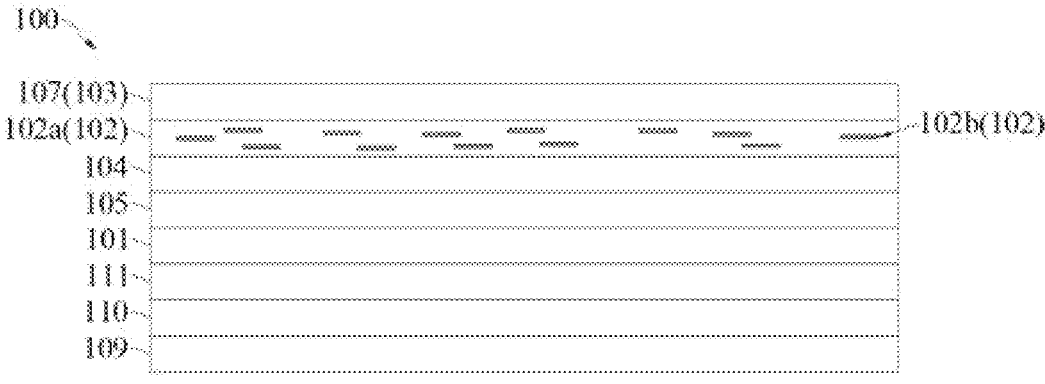
FIG. 1
100
106(103)
102a(102)
104
105
101
111
110
109
102b(102)
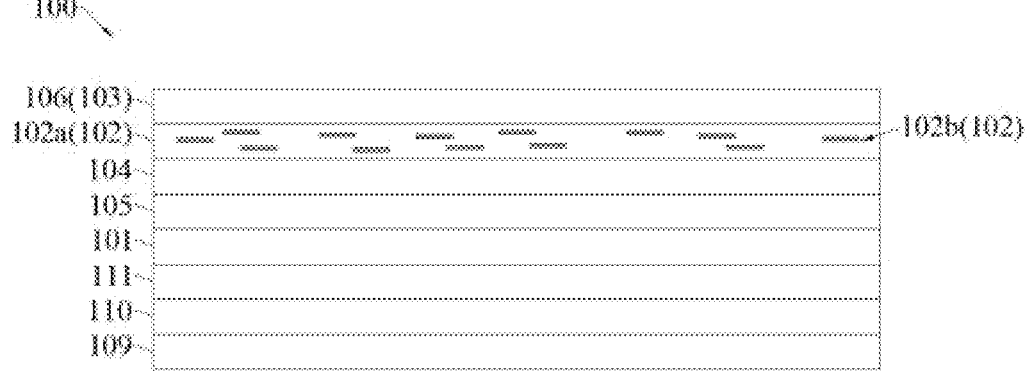
FIG. 2
100
107(103)
102a(102)
104
101
111
110
109
102b(102)
FIG. 3

100
108b(108)
108a(108)
102a(102)
104
105
101
111
110
109
102b(102)
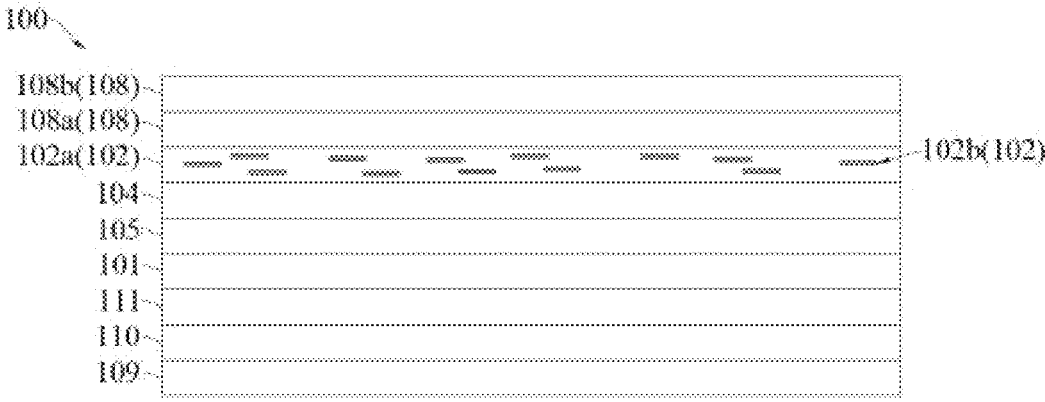
FIG. 4
100
106(103)
102a(102)
104
101
111
110
109
102b(102)
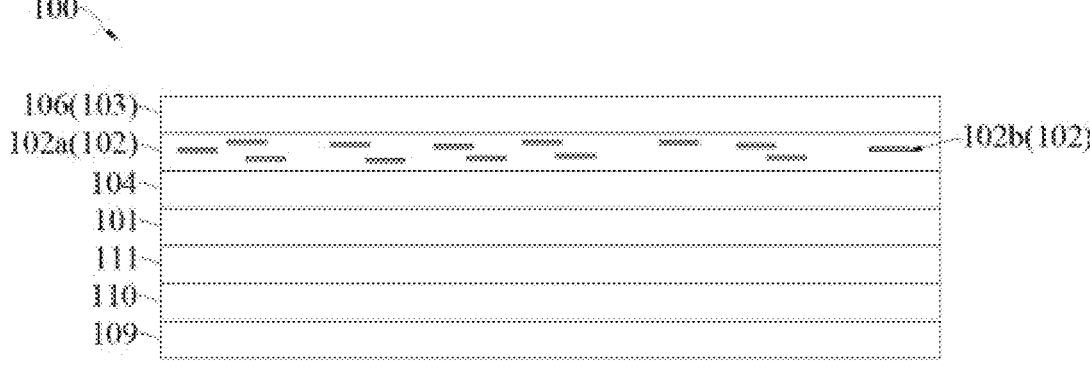
FIG. 5
108b(108)
108a(108)
112
113
105
101
111
110
109
FIG. 6

106(103)
114
104
105
101
111
110
109

10

300
200
500
400

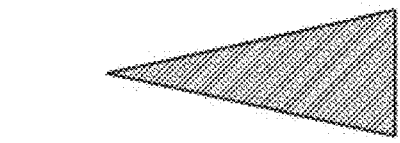
FIG. 12
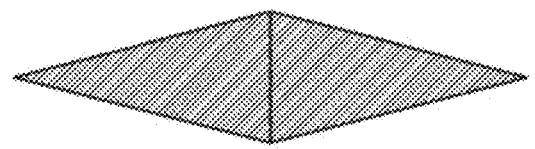
FIG. 13
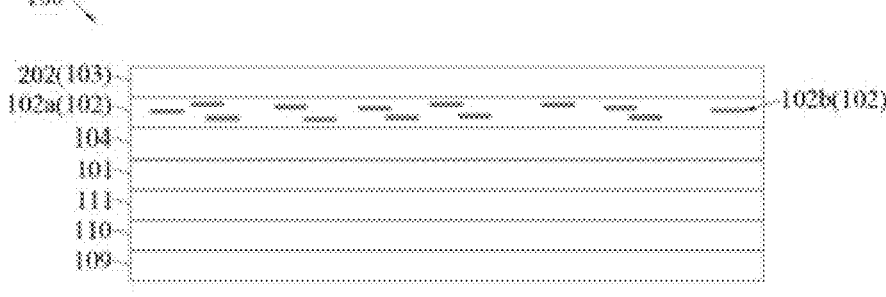
FIG. 14
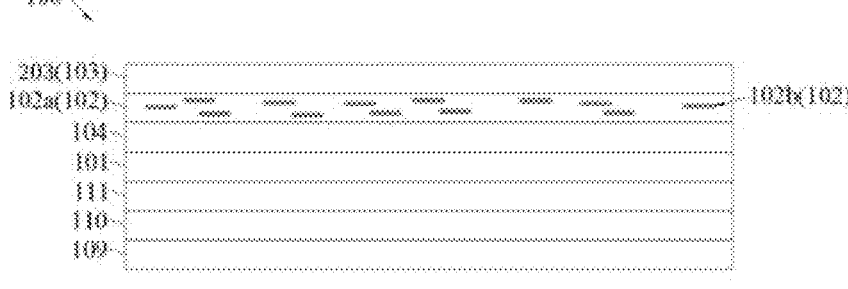
FIG. 15
FIG. 16

POLARIZER AND DISPLAY DEVICE

CROSS-REFERENCE TO RELATED APPLICATIONS

This application is a continuation of International Application No. PCT/CN2023/112877, filed on Aug. 14, 2023, which claims priority to Chinese Application No. 202310393880.2, filed on Apr. 13, 2023. The disclosures of the aforementioned applications are hereby incorporated by reference in their entireties.

TECHNICAL FIELD

The present application relates to the field of display technologies, and particularly to a polarizer and a display device.

BACKGROUND

Currently, to enlarge a chromaticity viewing angle of a display device, an optical film for enlarging the chromaticity viewing angle is usually provided on outermost side of a polarizer. In a conventional optical film for enlarging the chromaticity viewing angle, it is necessary to add a corresponding film layer to the polarizer. As a result, a thickness of the polarizer is increased, the display device emits reduced outgoing lights, and contrast of the display device is deteriorated.

Accordingly, a polarizer and a display device are required to solve the above technical problems.

SUMMARY

The present application provides a polarizer and a display device, which alleviate the technical problem of deteriorating contrast caused by the addition of a film layer to a polarizer to reduce outgoing lights from a display device.

To solve the above problems, the present application provides the following technical solutions:

The present application provides a polarizer that includes:

a polarizing layer;

a first optical functional layer on a side of the polarizing layer, the first optical functional layer includes a substrate and a light-diffusing particle dispersed in the substrate;

wherein the substrate has a glass transition temperature ranging from 30° C. to 500° C., and the substrate has an elastic modulus ranging from 500 MPa to 5000 MPa at 23° C.;

the front projection of the long axis of the light-diffusing particle in the first plane has a first orientation angle, the front projection of the absorption axis of the polarizing layer in the first plane has a second orientation angle, the difference between the first orientation angle and the second orientation angle has an average value of less than or equal to 5°, and the first plane is parallel to the plane in which the polarizing layer is located.

In some embodiments, the long axis of the light-diffusing particle defines an acute angle with the first plane, and the angle is less than or equal to 40°.

In some embodiments, the light-diffusing particles are selected from at least one of a first type of light-diffusing particles, a second type of light-diffusing particles, a third type of light-diffusing particles, a fourth type of light-diffusing particles, and a fifth type of light-diffusing particles;

wherein a variation value of a diameter of the first type of light-diffusing particles along an extension direction of a long axis of the first type of light-diffusing particles is less than or equal to 0.3 μm;

along an extension direction of a long axis of the second type of light-diffusing particles, a variation value of a diameter of a middle portion of the second type of light-diffusing particles is less than or equal to 1 μm. Along the direction away from the middle portion of the second type of light-diffusing particles, the diameter of the first end of the second type of light-diffusing particles gradually decreases, and a variation value of a diameter of the second end of the second type of light-diffusing particles is less than or equal to 1 μm;

along an extension direction of a long axis of the third type of light-diffusing particles, a variation value of a diameter of a middle portion of the third type of light-diffusing particles is less than or equal to 1 μm. Along the direction away from the middle portion of the third type of light-diffusing particles, a diameter of the first end of the third type of light-diffusing particles gradually decreases, and a diameter of the second end of the third type of light-diffusing particles gradually decreases;

a first end of the fourth type of light-diffusing particles is sequentially connected to a second end of the fourth type of light-diffusing particles, and a diameter of the fourth type of light-diffusing particles gradually decreases in a direction from the first end to the second end of the fourth type of light-diffusing particles;

a first end of the fifth type of light-diffusing particles is sequentially connected to a second end of the fifth type of light-diffusing particles, and a diameter of the first end of the fifth type of light-diffusing particles gradually decreases in a direction away from the second end of the fifth type of light-diffusing particles, and a diameter of the second end of the fifth type of light-diffusing particles gradually decreases in a direction away from the first end of the fifth type of light-diffusing particles.

In some embodiments, the first type of light-diffusing particles are rod-shaped particles, the second type of light-diffusing particles consists of needle-shaped particles with a reduced diameter at one end, the third type of light-diffusing particles consists of needle-shaped particles with a reduced diameter at both ends, the fourth type of light-diffusing particles consists of long cone-shaped particles, and the fifth type of light-diffusing particles consists of bicone-shaped particles.

In some embodiments, the light-diffusing particles are selected from at least two of the first type of light-diffusing particles, the second type of light-diffusing particles, the third type of light-diffusing particles, the fourth type of light-diffusing particles, and the fifth type of light-diffusing particles.

In some embodiments, the light-diffusing particles are selected from the first type of light-diffusing particles, the second type of light-diffusing particles, and the third type of light-diffusing particles.

In some embodiments, the light-diffusing particles are selected from the first type of light-diffusing particles, the fourth type of light-diffusing particles, and the fifth type of light-diffusing particles.

In some embodiments, the light-diffusing particles are selected from the first type of light-diffusing particles, the second type of light-diffusing particles, the third type of light-diffusing particles, the fourth type of light-diffusing particles, and the fifth type of light-diffusing particles.

In some embodiments, a mass fraction of the first type of light-diffusing particles in the light-diffusing particles range from 1% to 8%, the mass fraction of the second type of light-diffusing particles and the mass fraction of the fourth type of light-diffusing particles in the light-diffusing particles range from 40% to 50%, and the mass fraction of the third type of light-diffusing particles and the mass fraction of the fifth type of light-diffusing particles in the light-diffusing particles range from 45% to 55%.

In some embodiments, the material of the substrate is selected from at least one of triacetyl cellulose, polyethylene terephthalate, polycarbonate, polymethyl methacrylate, polycyclic olefin, polyethylene naphthalate two formic acid glycol ester.

In some embodiments, the material of the substrate is selected from triacetyl cellulose;

wherein the average value of the difference between the first orientation angle and the second orientation angle is less than or equal to 2.3°.

In some embodiments, the material of the substrate is selected from polyethylene terephthalate or polymethyl methacrylate;

wherein the average value of the difference between the first orientation angle and the second orientation angle is less than or equal to 3.5°.

In some embodiments, the ratio of the long axis of the light-diffusing particle to the diameter of the light-diffusing particles is greater than or equal to 1, and the ratio of the long axis of the light-diffusing particle to the diameter of the light-diffusing particles is less than or equal to 100.

In some embodiments, the long axis of the light-diffusing particle is greater than or equal to 5 μm and the long axis of the light-diffusing particle is less than or equal to 50 μm.

In some embodiments, the surface of the light-diffusing particle includes at least one of an inorganic cationic group, an inorganic anionic group, a polymeric group, a coupling agent group, or a surfactant group.

In some embodiments, the mass fraction of the light-diffusing particles in the first optical functional layer is greater than or equal to 3%, and the mass fraction of the light-diffusing particles in the first optical functional layer is less than or equal to 30%.

In some embodiments, the absolute value of the difference between the refractive indices of the substrate and the light-diffusing particles is greater than or equal to 0.02.

In some embodiments, the thickness of the first optical functional layer is greater than or equal to 15 μm, and the thickness of the first optical functional layer is less than or equal to 150 μm.

In some embodiments, the polarizer further includes a second optical functional layer on at least one side of the substrate, the second optical functional layer includes at least one of an anti-glare sublayer, a transparent hardening sublayer, a low reflection sublayer, an anti-reflection sublayer, an anti-fingerprint sublayer, and an anti-static sublayer;

wherein the second optical functional layer is located between the polarizing layer and the first optical functional layer; or the second optical functional layer is located on the side of the first optical functional layer away from the polarizing layer.

In some embodiments, the thickness of the first optical functional layer is greater than or equal to 15 μm, and the thickness of the first optical functional layer is less than or equal to 150 μm.

The present application further provides a display device including a polarizer, the polarizer includes:

a polarizing layer;

a first optical functional layer on a side of the polarizing layer, the first optical functional layer includes a substrate and light-diffusing particles dispersed in the substrate;

wherein the substrate has a glass transition temperature ranging from 30° C. to 500° C., and the substrate has an elastic modulus ranging from 500 MPa to 5000 MPa at 23° C.;

the front projection of the long axis of the light-diffusing particle in the first plane has a first orientation angle, the front projection of the absorption axis of the polarizing layer in the first plane has a second orientation angle, an average value of the difference between the first orientation angle and the second orientation angle is less than or equal to 5°, and the first plane is parallel to the plane in which the polarizing layer is located.

Beneficial Effect

According to the present application, by arranging the light-diffusing particles in the first optical functional layer of the polarizer, the chromaticity viewing angle of the display device applied with the polarizer is improved, and no additional film layer is needed for the polarizer, the loss of outgoing lights emitted from the display device is reduced, and the contrast of the display device is improved.

BRIEF DESCRIPTION OF THE DRAWINGS

FIG. 1 is a schematic diagram of a first structure of a polarizer according to some embodiments of the present application;

FIG. 2 is a schematic diagram of a second structure of a polarizer according to some embodiments of the present application;

FIG. 3 is a schematic diagram of a third structure of a polarizer according to some embodiments of the present application;

FIG. 4 is a schematic diagram of a fourth structure of a polarizer according to some embodiments of the present application;

FIG. 5 is a schematic diagram of a fifth structure of a polarizer according to some embodiments of the present application;

FIG. 6 is a schematic diagram of a first structure of a polarizer in related art;

FIG. 12 is a schematic diagram of the fourth type of light-diffusing particle;

FIG. 13 is a schematic diagram of the fifth type of light-diffusing particle;

FIG. 14 is a schematic diagram of a sixth structure of a polarizer according to some embodiments of the present application;

FIG. 15 is a schematic diagram of a seventh structure a polarizer according to some embodiments of the present application;

FIG. 16 is a schematic diagram of an eighth structure of a polarizer according to some embodiments of the present application;

DETAILED DESCRIPTION OF THE EMBODIMENTS

Figure 7:
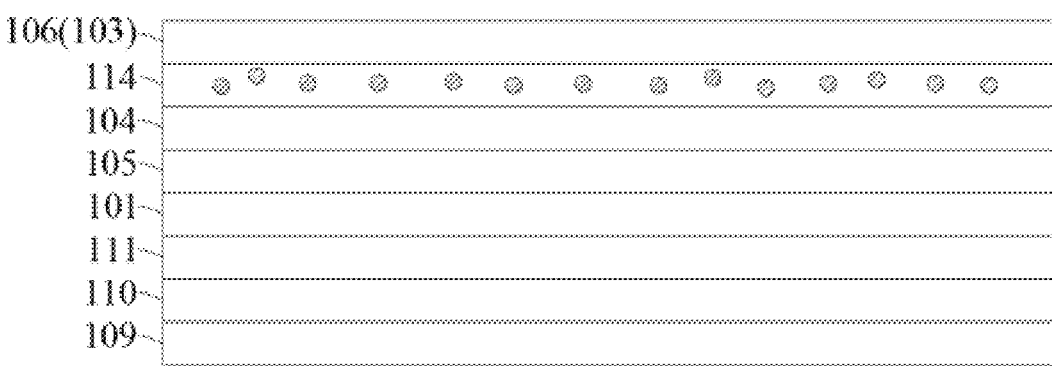
FIG. 7 is a schematic diagram of a second structure of a polarizer in related art.

The present application provides a polarizer and a display device. In order to make the object, technical solution and effect of the present application more clearly, the present application is described in further detail with reference to the drawings. It should be understood that the embodiments described herein are merely illustrative of the present application and are not intended to limit the present application.

Currently, an additional optical film for enlarging a chromaticity viewing angle needs to be added to a polarizer, and the thickness of the polarizer is increased. As a result, the outgoing lights from a display device applied with the polarizer is reduced, and the contrast is deteriorated.

Referring to FIG. 1 to FIG. 5, some embodiments of the present application provide a polarizer 100, including:

a polarizing layer 101;

a first optical functional layer 102 on a side of the polarizing layer 101, the first optical functional layer 102 includes a substrate 102*a* and light-diffusing particles 102*b* dispersed in the substrate 102*a*;

wherein the substrate 102*a* has a glass transition temperature ranging from 30° C. to 500° C., and the substrate 102*a* has an elastic modulus ranging from 500 MPa to 5000 MPa at 23° C.;

the front projection of the long axis of the light-diffusing particle 102*b* in the first plane has a first orientation angle, the front projection of the absorption axis of the polarizing layer 101 in the first plane has a second orientation angle, the average value of the difference between the first orientation angle and the second orientation angle is less than or equal to 5°, and the first plane is parallel to the plane in which the polarizing layer 101 is located.

According to the present application, by arranging the light-diffusing particles 102*b* in the first optical functional layer 102 of the polarizer 100, the chromaticity viewing angle of the display device applied with the polarizer 100 is improved, and the addition of the film layer to the polarizer 100 is avoided, thereby the loss of the light emitted from the display device is reduced and the contrast of the display device is improved.

The technical solution of the present application is described with reference to some embodiments.

Referring to FIG. 1 to FIG. 5, in some embodiments, the difference between the first orientation angle and the second orientation angle is the difference in angle between the first orientation angle and the second orientation angle, and the difference between the first orientation angle and the second orientation angle is an absolute value. The average value of the difference between the first orientation angle and the second orientation angle is less than or equal to 5°, which may be 0°, 0.5°, 1°, 1.3°, 1.5°, 1.8°, 2°, 2.3°, 2.5°, 2.8°, 3°, 3.3°, 3.5°, 3.8°, 4°, 4.3°, 4.5°, 4.8°, that is the average angle difference between the first directional angle and the second directional angle is −5° to 5°. By providing the absolute value of the angle difference between the orthographic projection of the long axis of the light-diffusing particle 102*b* in the first plane and the orthographic projection of the absorption axis of the polarizing layer 101 in the first plane less than or equal to 5°, it is advantageous to make more light change the propagation direction through the light-diffusing particles 102*b*, thereby improving the chromaticity viewing angle and the contrast.

In some embodiments, an included angle α1 between the long axis L of the light-diffusing particle 102*b* and the first plane, the angle is an acute angle less than or equal to 40° and may be, for example, 2°, 5°, 8°, 10°, 12°, 15°, 18°, 20°, 22°, 25°, 28°, 30°, 32°, 35°, 38°, 40°. There is an included angle between the long axis of the light-diffusing particle 102*b* and the first plane in space, which facilitates further changing the propagation direction of more light through the light-diffusing particles 102*b*, thereby improving the chromaticity viewing angle and the contrast.

In some embodiments, the orthographic projection of the long axis of the light-diffusing particle 102*b* in the second plane has a third orientation angle, the orthographic projection of the absorption axis of the polarizing layer 101 in the second plane has a fourth orientation angle, the average value of the differences between the third orientation angle and the fourth orientation angle is greater than or equal to −5°, the average value of the differences between the third orientation angle and the fourth orientation angle is less than or equal to 5°, the second plane is perpendicular to the plane in which the polarizing layer 101 is located, the second plane is not perpendicular to the absorption axis of the polarizing layer 101, and the second plane is not perpendicular to the long axis of the light-diffusing particle 102*b*. By making the absolute value of the angle difference between the orthographic projection of the long axis of the light-diffusing particle 102*b* in the second plane and the orthographic projection of the absorption axis of the polarizing layer 101 in the second plane less than or equal to 5°, the long axis of the light-diffusing particle 102*b* is spatially approximately parallel to the absorption axis of the polarizing layer 101, which facilitates further changing the propagation direction of more light through the light-diffusing particles 102*b*, thereby improving the chromaticity viewing angle and the contrast.

In some embodiments, the difference between the third orientation angle and the fourth orientation angle is the angle difference between the third orientation angle and the fourth orientation angle, the difference between the third orientation angle and the fourth orientation angle is an absolute value, and the average value of the difference between the third orientation angle and the fourth orientation angle is less than or equal to 5°, for example, the average value could be 0°, 0.5°, 1°, 1.3°, 1.5°, 1.8°, 2°, 2.3°, 2.5°, 2.8°, 3°.

In some embodiments, the average value of the difference between the first orientation angle and the second orientation angle is less than or equal to 5°, that is, when the second orientation angle is 0°, the average value of the angle between the first orientation angle and the second orientation angle is less than or equal to 5°. The average value of the difference between the third orientation angle and the fourth orientation angle is less than or equal to 5°, that is, the average value of the angle between the third orientation angle and the fourth orientation angle is less than or equal to 5°.

The average value of the difference between the first orientation angle and the second orientation angle in the first optical functional layer 102, and the average value of the difference between the third orientation angle and the fourth orientation angle in the first optical functional layer 102 may be obtained after the first optical functional layer 102 is photographed by an optical microscope and statistically analyzed by an existing program.

In some embodiments, the light-diffusing particles 102*b* are selected from at least one of a first type of light-diffusing particles, a second type of light-diffusing particles, a third type of light-diffusing particles, a fourth type of light-diffusing particles, and a fifth type of light-diffusing particles.

In some embodiments, shapes of the first type of light-diffusing particles, the second type of light-diffusing particles, the third type of light-diffusing particles, the fourth type of light-diffusing particles, and the fifth type of light-diffusing particles are different from each other.

In some embodiments, the variation in diameter of the first type of light-diffusing particles along the extension direction of the long axis of the first type of light-diffusing particle is less than or equal to 0.3 μm, for example, it may be 0 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In some embodiments, a diameter of a first end of the first type of light-diffusing particles is the same as a diameter of a middle portion of the first type of light-diffusing particles, and a diameter of a second end of the first type of light-diffusing particles is the same as a diameter of a middle portion of the first type of light-diffusing particles, along the direction of extension of the long axis of the first type of light-diffusing particles.

In some embodiments, the first type of light-diffusing particles may be rod-shaped, and when the first type of light-diffusing particles is rod-shaped, the cross-section of the first type of light-diffusing particles in a plane perpendicular to the long axis of the first type of light-diffusing particles is circular or elliptical. When the orthographic projection of the first type of light-diffusing particles in a plane perpendicular to the long axis of the first type of light-diffusing particles is elliptical, the diameter of the first type of light-diffusing particles is the length of the long axis of the elliptical, the ratio of the long axis of the elliptical to the minor axis of the elliptical is greater than 1 and less than or equal to 3, for example, it can be 1.2, 1.5, 1.8, 2, 2.2, 2.5, 2.8, etc.

In some embodiments, the variation in diameter of the middle portion of the second type of light-diffusing particles along the direction of extension of the long axis of the second type of light-diffusing particles is less than or equal to 1 μm, for example, it may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In a direction away from the middle portion of the second type of light-diffusing particles, the diameter of the first end of the second type of light-diffusing particles gradually decreases, and the second end of the second type of light-diffusing particles has a variation value of a diameter of less than or equal to 1 μm, for example, it may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1

μm, 0.08 μm, 0.05 μm, 0.02 μm, etc. In some embodiments, the diameter of the first end of the second type of light-diffusing particles is gradually reduced in a direction away from the middle portion of the second type of light-diffusing particles, and the diameter of the second end of the second type of light-diffusing particles is the same as the diameter of the middle portion of the second type of light-diffusing particles.

In some embodiments, the second type of light-diffusing particles may be needle-shaped with a reduced diameter at one end.

In some embodiments, the orthographic projection of the second type of light-diffusing particles in a plane perpendicular to the long axis of the second type of light-diffusing particles may be circular or elliptical, when the orthographic projection of the second end of the second type of light-diffusing particles or the middle portion of the second type of light-diffusing particles in a plane perpendicular to the long axis of the second type of light-diffusing particles is an elliptical, the ratio of the long axis of the elliptical to the minor axis of the elliptical is greater than 1 and less than or equal to 3, for example, it may be 1.2, 1.5, 1.8, 2, 2.2, 2.5, 2.8, etc., The cross-section of the first end of the second type of light-diffusing particles in any plane perpendicular to the long axis of the second type of light-diffusing particles coincides with the cross-section of the middle portion of the second type of light-diffusing particles in any plane perpendicular to the long axis of the second type of light-diffusing particles, and the area gradually decreases in a direction away from the middle portion of the second type of light-diffusing particles.

In some embodiments, the variation in diameter of the middle portion of the third type of light-diffusing particles along the direction of extension of the long axis of the third type of light-diffusing particles is less than or equal to 1 μm, for example, it may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc; in a direction away from the middle portion of the light-diffusing particles of the third type the diameter of the first end of the light-diffusing particles of the third type gradually decreases and the diameter of the second end of the light-diffusing particles of the third type gradually decreases. In some embodiments, along the direction of extension of the long axis of the third type of light-diffusing particles the diameter of the middle portion of the third type of light-diffusing particles is uniform, while the diameter of the first end and the second end of the third type of light-diffusing particles gradually change.

In some embodiments, the third type of light-diffusing particles may be needle-shaped with reduced diameters at both ends.

In some embodiments, the orthographic projection of the third type of light-diffusing particles in a plane perpendicular to the long axis of the third type of light-diffusing particles may be circular or elliptical, when the orthographic projections of the middle portion of the third type of light-diffusing particles in a plane perpendicular to the long axis of the third type of light-diffusing particles is an ellipse, the ratio of the long axis of the ellipse to the minor axis of the ellipse is greater than 1 and less than or equal to 3, for example, it may be 1.2, 1.5, 1.8, 2, 2.2, 2.5, 2.8, etc. The cross-section of the first end and the second end of the third type of light-diffusing particles in any plane perpendicular to the long axis of the third type of light-diffusing particles coincides with the cross-section of the middle portion of the third type of light-diffusing particles in any plane perpendicular to the long axis of the third type of light-diffusing particles, and the area of the cross-section gradually decreases in a direction away from the middle portion of the third type of light-diffusing particles.

In some embodiments, a first end of the fourth type of light-diffusing particles is sequentially connected to a second end of the fourth type of light-diffusing particles, and a diameter of the fourth type of light-diffusing particles is gradually reduced in a direction from the first end to the second end of the fourth type of light-diffusing particles.

In some embodiments, the fourth type of light-diffusing particles may be long cones.

The cross section of the fourth type of light-diffusing particles in a plane perpendicular to the long axis of the fourth type of light-diffusing particles is circular or elliptical. Along the direction from the first end to the second end of the fourth type of light-diffusing particles, the cross-section of the fourth type of light-diffusing particles in a plane perpendicular to the long axis of the fourth type of light-diffusing particles is uniform in shape and gradually decreases in area. When the cross-section of the fourth type of light-diffusing particles in the plane perpendicular to the long axis of the fourth type of light-diffusing particles is elliptical, the diameter of the fourth type of light-diffusing particles is the length of the long axis of the elliptical, and the ratio of the long axis of the elliptical to the minor axis of the elliptical is greater than 1 and less than or equal to 3, for example, it can be 1.2, 1.5, 1.8, 2, 2.2, 2.5, 2.8, and so on.

In some embodiments, a first end of the fifth type of light-diffusing particles is sequentially connected to a second end of the fifth type of light-diffusing particles, a diameter of the first end of the fifth type of light-diffusing particles gradually decreases in a direction away from the second end of the fifth type of light-diffusing particles, and a diameter of the second end of the fifth type of light-diffusing particles gradually decreases in a direction away from the first end of the fifth type of light-diffusing particles.

In some embodiments, the fifth type of light-diffusing particles may be bicone-shaped.

The cross section of the fifth type of light-diffusing particles in a plane perpendicular to the long axis of the fifth type of light-diffusing particles is circular or elliptical. In a direction away from the second end of the fifth type of light-diffusing particles, a cross-section of the first end of the fifth type of light-diffusing particles in a plane perpendicular to the long axis of the fifth type of light-diffusing particles is uniform in shape and gradually decreases in area; in a direction away from the first end of the fifth type of light-diffusing particles, a cross-section of the second end of the fifth type of light-diffusing particles in a plane perpendicular to the long axis of the fifth type of light-diffusing particles is uniform in shape and gradually decreases in area. When the cross section of the fifth type of light-diffusing particles in a plane perpendicular to the long axis of the fifth type of light-diffusing particles is elliptical, the diameter of the fifth type of light-diffusing particles is the length of the long axis of the elliptical, and the ratio of the long axis of the elliptical to the minor axis of the elliptical is greater than 1 and less than or equal to 3, for example, it can be 1.2, 1.5, 1.8, 2, 2.2, 2.5, 2.8, and so on.

In some embodiments, the light-diffusing particles $102b$ are selected from at least two of the first type of light-diffusing particles, the second type of light-diffusing particles, the third type of light-diffusing particles, the fourth type of light-diffusing particles, and the fifth type of light-diffusing particles; in some embodiments, the light-diffusing particles $102b$ are a mixture of the first-type light-diffusing particles, the second-type light-diffusing particles, and the third-type light-diffusing particles, or the light-diffusing particles $102b$ are a mixture of the first-type light-diffusing particles, the fourth-type light-diffusing particles, and the fifth-type light-diffusing particles, or the light-diffusing particles $102b$ are a mixture of the first-type light-diffusing particles, the second-type light-diffusing particles, the third-type light-diffusing particles, the fourth-type light-diffusing particles, and the fifth-type light-diffusing particles. By selecting the light-diffusing particles $102b$ from at least two kinds of particles with different shapes, the diversity of the shapes of the light-diffusing particles $102b$ is increased, the optical anisotropy of the light-diffusing particles $102b$ is increased, and the effect of improving the contrast and brightness of the light-diffusing particles $102b$ is enhanced.

In some embodiments, when the light-diffusing particles $102b$ are selected from the group consisting of a first type of light-diffusing particles, a second type of light-diffusing particles, and a third type of light-diffusing particles, or the light-diffusing particles $102b$ are selected from the group consisting of the first type of light-diffusing particles, the fourth type of light-diffusing particles, and the fifth type of light-diffusing particles, or the light-diffusing particles $102b$ are a mixture of the first type of light-diffusing particles, the second type of light-diffusing particles, the third type of light-diffusing particles, the fourth type of light-diffusing particles, and the fifth type of light-diffusing particles, the mass fraction of the first type of light-diffusing particles in the light-diffusing particles $102b$ range from 1% to 8%, for example, it may be 1.5%, 2%, 2.5%, 3%, 3.5%, 4%, 4.5%, 5%, 6%, 6.5%, 7%, 7.5%, and the like; the mass fraction of the second type of light-diffusing particles and/or the fourth type of light-diffusing particles in the light-diffusing particles $102b$ range from 40% to 50%, for example, it may be 41%, 42%, 43%, 44%, 45%, 46%, 47%, 48%, 49%, etc.; the mass fraction of the third type of light-diffusing particles and/or the fifth type of light-diffusing particles in the light-diffusing particles $102b$ range from 45% to 55%, for example, it may be 46%, 47%, 48%, 49%, 50%, 51%, 52%, 53%, 54%, etc. Mixing the first-type light-diffusing particles, the second-type light-diffusing particles, and/or the fourth-type light-diffusing particles, the third-type light-diffusing particles, and/or the fifth-type light-diffusing particles according to the above ratio further improves the contrast and brightness of the obtained light-diffusing particles $102b$.

In some embodiments, the mass fraction of the light-diffusing particles $102b$ in the first optical functional layer $102$ range from 3% to 30%, for example, it may be 5%, 8%, 10%, 13%, 15%, 18%, 20%, 23%, 25%, 28%, etc., this facilitates significant light diffusion while avoiding affecting the transparency of the optical functional layer.

In some embodiments, the length of the long axis of the light-diffusing particle $102b$ in the direction of the long axis of the light-diffusing particle $102b$ is the distance between the two ends of the long axis of the light-diffusing particle $102b$. The long axis of the light-diffusing particle $102b$ is greater than or equal to 5 μm, the long axis of the light-diffusing particle $102b$ is less than or equal to 50 μm, for example, it may be 10 μm, 15 μm, 20 μm, 25 μm, 30 μm, 35 μm, 40 μm, 45 μm, etc. When the length of the long axis of the light-diffusing particle $102b$ is within the above range, the long axis of the light-diffusing particle $102b$ is easy to orient, so that an average value of a difference between the first orientation angle and the second orientation angle is less than or equal to 5°, and an average value of a difference between the third orientation angle and the fourth orientation angle is less than or equal to 5°; in some embodiments, the long axis of the light-diffusing particle 102b is greater than or equal to 10 μm, the long axis of the light-diffusing particle 102b is less than or equal to 30 μm, and it is further advantageous to make the long axis of the light-diffusing particle 102b easy to orient, so that it is easier to make the average value of the difference between the first orientation angle and the second orientation angle less than or equal to 5°, and the average value of the difference between the third orientation angle and the fourth orientation angle less than or equal to 5°.

In some embodiments, the diameter of the light-diffusing particles 102b is greater than or equal to 0.5 μm, the diameter of the light-diffusing particles 102b is less than or equal to 5 μm, for example, it may be 0.6 μm, 0.7 μm, 0.8 μm, 0.9 μm, 1 μm, 1.2 μm, 1.5 μm, 1.8 μm, 2 μm, 2.5 μm, 3 μm, 3.5 μm, 4 μm, 4.5 μm, etc., it is advantageous to obtain an aspect ratio that causes light to change the direction of propagation more through the long axis surface of the light-diffusing particles 102b; in some embodiments, the diameter of the light-diffusing particles 102b is greater than or equal to 0.5 μm, and the diameter of the light-diffusing particles 102b is less than or equal to 2 μm, and it is further advantageous to obtain an aspect ratio that causes light to change the propagation direction more through the long-axis surface of the light-diffusing particles 102b.

In some embodiments, the aspect ratio of the light-diffusing particles 102b is the ratio of the length of each light-diffusing particle to the maximum diameter of the light-diffusing particle. The light-diffusing particles 102b have an aspect ratio greater than or equal to 1, and the light-diffusing particles 102b have an aspect ratio less than or equal to 100, for example, it may be 2, 5, 10, 12, 15, 16, 18, 20, 30, 32, 34, 35, 36, 38, 40, 42, 45, 46, 48, 50, 52, 55, 56, 58, 60, 62, 65, 68, 70, 80, 90, etc.; in some embodiments, the aspect ratio of the light-diffusing particles 102b is greater than or equal to 5, and the aspect ratio of the light-diffusing particles 102b is less than or equal to 60.

In some embodiments, the material of the substrate 102a is selected from resin materials, for example, the material of the substrate 102a may be selected from at least one of triacetyl cellulose (TAC), polyethylene terephthalate (PET), polycarbonate (PC), polymethyl methacrylate (PMMA), copolymers of cycloolefin (COC), polyethylene naphthalate two formic acid glycol ester (PEN).

In some embodiments, the material selection of the substrate 102a is different, and the substrate 102a is formed differently, for example, depending on the forming material of the substrate 102a the substrate 102a may be formed without stretching, stretched in a first direction, or first stretched in a first direction and then stretched in a second direction. Wherein the first direction is parallel to the direction of the absorption axis of the polarizing layer 101, and the second direction is perpendicular to the first direction. When the substrate 102a is formed by stretching in a first direction, the light-diffusing particles 102b are dispersed in a resin material forming the substrate 102a, and the light-diffusing particles 102b likewise undergo stretching in the first direction, and the orientation of the long axis of the light-diffusing particle 102b is adjusted is adjusted during the formation of the substrate 102a, thereby facilitating further reduction of the average value of the difference between the first orientation angle and the second orientation angle and/or the average value of the difference between the third orientation angle and the fourth orientation angle. When the substrate 102a is formed by stretching first in the first direction and then in the second direction, the light-diffusing particles 102b are dispersed in the resin material forming the substrate 102a, and the light-diffusing particles 102b are likewise subjected to stretching in the first direction and stretching in the second direction, and the orientation of the long axis of the light-diffusing particle 102b is likewise adjusted during the formation of the substrate 102a, thereby facilitating a reduction in the average value of the difference between the first orientation angle and the second orientation angle and/or the average value of the difference between the third orientation angle and the fourth orientation angle.

Therefore, the extreme value of the average value of the difference between the first orientation angle and the second orientation angle in the substrate 102a formed without stretching is greater than the extreme value of the average value of the difference between the first orientation angle and the second orientation angle in the substrate 102a formed with stretching in the first direction; an extreme value of the average value of the difference between the first orientation angle and the second orientation angle in the substrate 102a formed without stretching is greater than an extreme value of the average value of the difference between the first orientation angle and the second orientation angle in the substrate 102a formed by first stretching in the first direction and then stretching in the second direction. The extreme value of the average value of the difference between the first orientation angle and the second orientation angle is the maximum value achievable by the average value of the difference between the first orientation angle and the second orientation angle, for example, when the average value of the difference between the first orientation angle and the second orientation angle is less than or equal to 5°, the average value of the difference between the first orientation angle and the second orientation angle is 5°.

An extreme value of an average value of a difference between the third orientation angle and the fourth orientation angle in the substrate 102a formed without stretching is greater than an extreme value of an average value of a difference between the third orientation angle and the fourth orientation angle in the substrate 102a stretched in the first direction; an extreme value of an average value of a difference between the third orientation angle and the fourth orientation angle in the substrate 102a formed without stretching is greater than an extreme value of an average value of a difference between the third orientation angle and the fourth orientation angle in the substrate 102a formed by first stretching in the first direction and then stretching in the second direction. The extreme value of the average value of the difference between the third orientation angle and the fourth orientation angle is the maximum value achievable by the average value of the difference between the third orientation angle and the fourth orientation angle, for example, when the average value of the difference between the third orientation angle and the fourth orientation angle is less than or equal to 5°, the extreme value of the average value of the difference between the third orientation angle and the fourth orientation angle is 5°.

In some embodiments, when the material of the substrate 102a is selected from triacetyl cellulose, the substrate 102a may be formed without stretching or stretched in the first direction; when the material of the substrate 102a is selected from polyethylene terephthalate or polyethylene naphthalate two formic acid glycol ester, the substrate 102a may be formed by stretching in the first direction or by stretching in the first direction and then stretching in the second direction; when the material of the substrate 102a is selected from polymethyl methacrylate, the substrate 102a may be formed by stretching in the first direction and then stretching in the second direction; when the material of the substrate 102a is selected from a polycycloolefin or a polycarbonate, the substrate 102a may be unstretched or stretched in the first direction or stretched in the second direction after stretching in the first direction.

In some embodiments, when the material of the substrate 102a is selected from triacetyl cellulose, the substrate 102a is formed from triacetyl cellulose by stretching in a first direction, and during the formation of the first optical functional layer 102, the light-diffusing particles 102b likewise undergo stretching in the first direction, the orientation of the long axis of the light-diffusing particle 102b is adjusted during the formation of the substrate 102a, the average value of the difference between the first orientation angle and the second orientation angle is less than or equal to 2.3°, for example, it may be 0°, 1.3°, 1.5°, 1.8°, 2°, 2.2°, etc., that is, the average angle difference between the first orientation angle and the second orientation angle ranges from −2.3° to 2.3°; and/or, the average value of the difference between the third orientation angle and the fourth orientation angle is less than or equal to 2.3°, for example, it may be 0°, 1.3°, 1.5°, 1.8°, 2°, 2.2°, etc., that is, the average angle difference between the third orientation angle and the fourth orientation angle ranges from −2.3° to 2.3°.

In some embodiments, the material of the substrate 102a is polyethylene terephthalate or polymethyl methacrylate, and when the substrate 102a is formed by stretching in the first direction and then stretching in the second direction, the light-diffusing particles 102b likewise undergo stretching in the first direction and in the second direction, and the orientation of the long axis of the light-diffusing particle 102b is re-adjusted during the formation of the substrate 102a, the average value of the difference between the first orientation angle and the second orientation angle is less than or equal to 3.5°, for example, it may be 0°, 1.3°, 1.5°, 1.8°, 2°, 2.3°, 2.5°, 2.8°, 3°, 3.3°, etc., that is, the average angle difference between the first orientation angle and the second orientation angle ranges from −3.5° to 3.5°; and/or the average value of the difference between the third orientation angle and the fourth orientation angle is less than or equal to 3.5°, for example, it may be 0°, 1.3°, 1.5°, 1.8°, 2°, 2.3°, 2.5°, 2.8°, 3°, 3.3°, etc., that is, the average angle difference between the third orientation angle and the fourth orientation angle ranges from −3.5° to 3.5°.

In some embodiments, the light-diffusing particles 102b are whiskers. The light-diffusing particles 102b are selected from at least one of silicon dioxide, silicon carbide, silicon nitride, zinc oxide, magnesium oxide, aluminum oxide, calcium sulfate, calcium carbonate, potassium titanate, and aluminum borate.

In some embodiments, the light-diffusing particles 102b may be surface-modified to aid in the dispersibility of the light-diffusing particles 102b in the substrate 102a or to enhance the toughness and the like functionality of the light-diffusing particles 102b. When the light-diffusing particles 102b are surface modified, the surface of the light-diffusing particles 102b is modified with at least one of inorganic cation, inorganic anion, polymer, coupling agent, or surfactant, that is, the surface of the light-diffusing particles 102b includes at least one of an inorganic cation group, an inorganic anion group, a polymer group, a coupling agent group, or a surfactant group.

In some embodiments, the surface of the light-diffusing particles 102b is modified with at least one of magnesium salt, inorganic calcium salt, inorganic barium salt, inorganic strontium salt, stearic acid, stearic acid salt, sulfonic acid surfactants, sulfo surfactants, titanate, aluminate, polyacrylamide, silane, alkyl phosphate, aryl phosphate, alkyl phosphate salt, aryl phosphate salt, alkylolamide phosphate ester, alkylolamide phosphate salt, imidazoline-like phosphate ester, imidazoline-like phosphate salt, high molecular weight polyphosphate ester, high molecular weight polyphosphate salt, siloxane phosphate.

Specifically, the surface of the light-diffusing particles 102b is modified with at least one member selected from magnesium chloride, calcium chloride, barium chloride, strontium chloride, stearic acid, sodium stearate, zinc stearate, sulfonic acid surfactants, sulfo surfactants, titanate, aluminate, polyacrylamide, silane, alkyl phosphate, aryl phosphate, alkyl phosphate salt, aryl phosphate salt, alkylolamide phosphate ester, alkylolamide phosphate salt, imidazoline-like phosphate ester, imidazoline-like phosphate salt, high molecular weight polyphosphate ester, high molecular weight polyphosphate salt, siloxane phosphate. In some embodiments, the surface of the light-diffusing particles 102b is modified with at least one of sulfonic acid surfactants or sulfo surfactants. The sulfonic acid surfactants may be selected from at least one of alkyl phosphate salt, fluoro alkyl phosphate salt, and specifically, at least one of sodium dodecyl sulfonate, sodium dodecyl benzene sulfonate, and sodium fluoro dodecyl sulfonate; the sulfo surfactants may be selected from at least one of mercaptan, fluoro mercaptan, specifically, at least one of octylthiol, dodecanethiol, tetradecyl mercaptan, octadecyl mercaptan, fluorooctadecanethiol, and fluorododecanethiol. When the sulfonic acid surfactants is mixed with the light-diffusing particles to be surface-modified, a sulfonic acid-based shell layer, such as a benzene ring sulfonic acid-based shell layer, is formed on the whisker surface of the sulfonic acid surfactants, which is favorable for protecting the light-diffusing particles, enhancing the toughness of the light-diffusing particles 102b, and reducing the breakage of the light-diffusing particles 102b in the first optical functional layer 102; when the thio-type surface-active group is mixed with the light-diffusing particles to be surface-modified, the thio-type surface-active group and the hydroxyl group on the surface of the whisker form a cross-linked network of O—S—O, and the bond energy of O—S—O is relatively large, thereby facilitating the protection of the light-diffusing particles 102b in the process of mixing the light-diffusing particles 102b with the material of the substrate 102a and forming the first optical functional layer 102, reducing the breakage of the light-diffusing particles 102b, and improving the contrast and brightness of the light-diffusing particles 102b. More preferably, the light-diffusing particles 102b are at least one of fluorine-substituent-containing sulfonic acid surfactants, fluorine-substituent-containing sulfo surfactants, in particular, at least one of sodium fluoro dodecyl sulfonate, fluoro octylthiol, and fluoro dodecylthiol, wherein the fluorine atom has a high stability in the alkyl chain, the bond energy of the carbon-fluorine bond is higher than the bond energy of the carbon-carbon bond, and the carbon-fluorine bond has a shielding effect on the carbon-carbon bond, thereby facilitating protection of the carbon-carbon bond, thereby improving the stability of the light-diffusing particles 102b.

In some embodiments, the absolute value of the difference between the refractive indices of the substrate 102a and the light-diffusing particles 102b is greater than or equal to 0.02, for example, it may be 0.03, 0.05, 0.09, 0.1, 0.15, 0.2, etc., to achieve the light diffusing function of the light-diffusing particles 102b.

In some embodiments, the substrate 102a has a glass transition temperature ranging from 30° C. to 500° C., for example, it may be 40° C., 50° C., 100° C., 150° C., 200° C., 250° C., 300° C., 350° C., 400° C., 450° C., and the like; the substrate 102a has an elastic modulus ranging from 500 MPa to 5000 MPa at 23° C., for example, it may be 600 MPa, 700 MPa, 800 MPa, 900 MPa, 1000 MPa, 1200 MPa, 1500 MPa, 1800 MPa, 2000 MPa, 2200 MPa, 2500 MPa, 2800 MPa, 3000 MPa, 3200 MPa, 3500 MPa, 3800 MPa, 4000 MPa, 4200 MPa, 4500 MPa, 4800 MPa, and the like.

In some embodiments, the elastic modulus of the substrate 102a can be obtained in a humidity of 50%.

In some embodiments, the thickness of the first optical functional layer 102 is greater than or equal to 15 μm, and the thickness of the first optical functional layer 102 is less than or equal to 150 μm, for example, it may be 20 μm, 25 μm, 30 μm, 40 μm, 50 μm, 60 μm, 80 μm, 100 μm, 120 μm, 130 μm, 140 μm, etc., to facilitate processing of the first optical functional layer 102 and to maintain appropriate light transmission of the first optical functional layer 102.

In some embodiments, the first optical functional layer 102 further includes a plasticizer dispersed in the substrate 102a, the plasticizer may be selected from at least one of a phosphate based plasticizer, a citrate based plasticizer, and a fatty acid ester based plasticizer; in the first optical functional layer 102, the mass fraction of the plasticizer is greater than or equal to 4%, less than or equal to 6%, for example, it may be 5%.

In some embodiments, the first optical functional layer 102 further includes an ultraviolet absorber dispersed in the substrate 102a, the ultraviolet absorber may be selected from at least one of a benzophenone-based ultraviolet absorber, a benzotriazole-based ultraviolet absorber, the mass fraction of the plasticizer is greater than or equal to 0.8%, less than or equal to 1.2%, for example, it may be 1%.

Referring to FIG. 1 to FIG. 5, in some embodiments, the polarizer 100 further includes a second optically functional layer 103 on at least one side of the substrate 102a.

In some embodiments, the second optical functional layer 103 is located between the polarizing layer 101 and the first optical functional layer 102; alternatively, the second optical functional layer 103 is located on the side of the first optical functional layer 102 away from the polarizing layer 101.

In some embodiments, the second optical functional layer 103 is located on the side of the first optical functional layer 102 away from the polarizing layer 101, and the polarizer 100 further includes a first adhesive layer 104 located in the first optical functional layer 102 adjacent to the polarizing layer 101.

In some embodiments, the first adhesive layer 104 is in direct contact with the polarizing layer 101; alternatively, the polarizer 100 further includes a protective layer 105 between the first optical functional layer 102 and the polarizing layer 101, and the first adhesive layer 104 is in direct contact with the protective layer 105.

In some embodiments, the first adhesive layer 104 is in direct contact with the first optical functional layer 102, and the first adhesive layer 104 is in direct contact with the polarizing layer 101; alternatively, the first adhesive layer 104 is in direct contact with the first optical functional layer 102 and the first adhesive layer 104 is in direct contact with the protective layer 105.

In some embodiments, the first adhesive layer 104 may be selected from at least one of a water adhesive, a pressure sensitive adhesive, and an ultraviolet adhesive, the material of the water adhesive may be selected from polyvinyl alcohol, the material of the pressure sensitive adhesive may be selected from acrylate copolymers, and the material of the ultraviolet adhesive may be selected from multifunctional acrylate monomers.

Referring to FIG. 1 to FIG. 5, in some embodiments, the second optical functional layer 103 includes at least one of an anti-glare sublayer 106, a transparent hardening sublayer 107, a low reflection sublayer 108, an anti-reflection sublayer 201, an anti-fingerprint sublayer 202, and an anti-static sublayer 203. When the second optical functional layer 103 is a low-reflection sublayer 108, the low-reflection sublayer 108 may be formed by stacking a transparent hardening sub-portion 108a and a low-refraction sub-portion 108b.

In some embodiments, the polarizing layer 101 consists of polyvinyl alcohol and a dye.

In some embodiments, the polarizer 100 further includes a release layer 109 on the side of the polarizing layer 101 away from the first optical functional layer 102, the release layer 109 is bonded to the polarizing layer 101 by a second adhesive layer 110. When the polarizer 100 is applied to the display device, the release layer 109 is removed to expose the second adhesive layer 110 so that the polarizer 100 is adhered to the display panel through the second adhesive layer 110.

In some embodiments, the polarizer 100 further includes a compensation layer 111 between the second adhesive layer 110 and the polarizing layer 101.

According to the embodiment of the present application, the light-diffusing particles 102b are disposed in the first optical functional layer 102 of the polarizer 100, so that the chromaticity viewing angle of the display device with the polarizer 100 is improved, and the addition of the film layer to the polarizer 100 is avoided, thereby reducing the loss of the light emitted from the display device, and improving the contrast of the display device.

Figure 8:
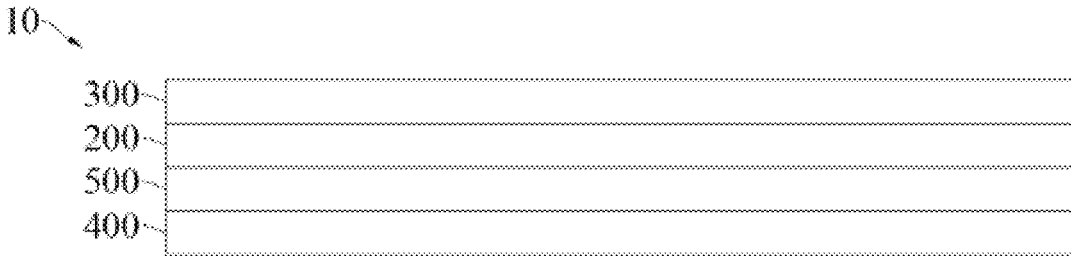
FIG. 8 is a schematic structure diagram of a display device according to some embodiments of the present application.
Figure 9:
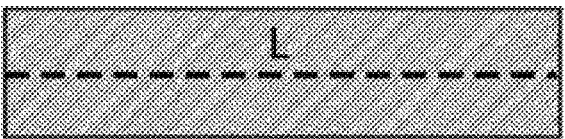
FIG. 9 is a schematic diagram of the first type of light-diffusing particle.
Figure 10:
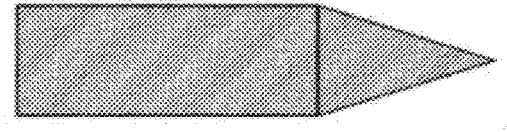
FIG. 10 is a schematic diagram of the second type of light-diffusing particle.
Figure 11:
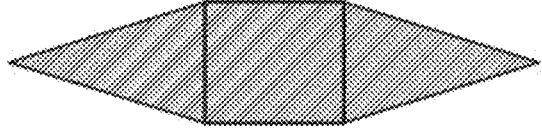
FIG. 11 is a schematic diagram of the third type of light-diffusing particle.
Figure 17:
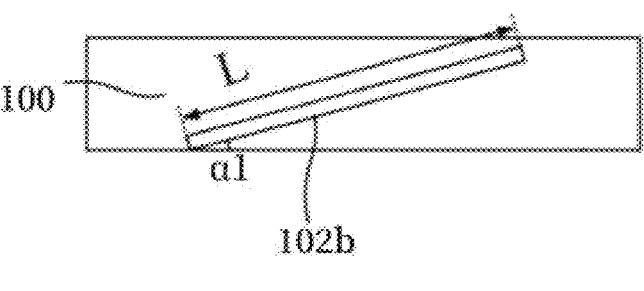
FIG. 17 shows an included angle between the long axis of the light-diffusing particle and the first plane.

Referring to FIG. 8, some embodiments of the present application further provide a display device 10 including a polarizer 100 as previously described.

Specifically, the display device includes a display panel 200 and a first polarizer 300 located on the light output side of the display panel 200, the first polarizer 300 is selected from the polarizer 100 described above.

In some embodiments, the display panel 200 may be a liquid crystal display panel, an emissive display panel, etc., and the emissive display panel may be an OLED (Organic Light-Emitting Diode) display panel, etc.

In some embodiments, a first optical functional layer in the first polarizer 300 is located on a side of the polarizer layer in the first polarizer 300 away from the display panel.

When the display panel 200 is a liquid crystal display panel, the display device 10 further includes a backlight module 400 located on a side of the display panel 200 away from the first polarizer 300, the backlight module 400 is used to provide a light source for the display panel 200; the display device 10 also includes a second polarizer 500 located between the backlight module 400 and the display panel 200. The second polarizer 500 may be selected from the polarizer 100 as previously described, or the second polarizer 500 may not be selected from the polarizer 100 as previously described.

Next, the present application will be described in more detail with reference to some embodiments. It should be noted, however, that these examples are provided for purposes of illustration only and should not be construed as limiting the application in any way.

Example 1

Dissolving a master batch of triacetyl cellulose (refractive index 1.50) powder in a solvent, adding a plasticizer triphenyl phosphate ester of 5% by mass of total solids, a 2-(2-hydroxy-5-methylphenyl) benzotriazole ultraviolet absorber of 1% by mass of total solids, and adding rod-shaped calcium sulfate light-diffusing particles, needle-shaped calcium sulfate light-diffusing particles with a reduced diameter at one end, and needle-shaped calcium sulfate light-diffusing particles with a reduced diameter at both ends, wherein the mass fractions of the three are 5%, 45%, and 50% in the light-diffusing particles, respectively. The light-diffusing particles in the master batch obtained after mixing the three components have a refractive index of 1.59, a long axis of 10-30 μm, and a diameter of 0.5-2 μm. All the three light-diffusing particles are surface-modified, and the surface modifier is stearic acid; the amount of light-diffusing particles added is 5% of the total mass of the solids, and uniform mother liquor is formed by stirring; the mother liquid is filtered, extruded onto the steel strip in a single layer through an extruder, and then dried to form a film. After the film is peeled from the steel strip, light-diffusing particles and triacetyl cellulose are oriented by longitudinal stretching (first direction) to form a substrate and light-diffusing particles dispersed in the substrate, thereby forming a first optical functional layer, wherein the thickness of the first optical functional layer is 40 μm. A second optical functional layer is coated on a side of the first optical functional layer. The second optical functional layer is a transparent hardening sublayer, and the other side of the first optical functional layer is coated with pressure sensitive adhesive as the first adhesive layer. Then, it is laminated with the pre polarizing film (formed by stacking the release layer, second adhesive layer, compensation layer, polarizing layer, and protective layer) in a roll to roll manner to obtain the polarizing film with a structure as shown in FIG. 1.

Example 2

Dissolving the master batch polyethylene terephthalate (refractive index 1.62) pellets in a solvent, adding 2-(2-hydroxy-5-methylphenyl) benzotriazole ultraviolet absorber with a total mass of 5% of solids, and adding rod-shaped calcium carbonate light-diffusing particles, needle-shaped calcium carbonate light-diffusing particles with a reduced diameter at one end, and needle-shaped calcium carbonate light-diffusing particles with a reduced diameter at both ends after uniform mixing, wherein the mass fractions of the three are 5%, 45%, and 50% in the light-diffusing particles, respectively, and the light-diffusing particles in the master batch obtained after mixing the three components have a refractive index of 1.67, a long axis of 10-30 μm, and a diameter of 0.5-2 μm, and all the three light-diffusing particles are surface modified, and the surface modifier is fluorothiol; the light-diffusing particles are added in an amount of 2.5% of the total mass of the solid, and are mixed homogeneously by a screw extruder and then cast into a film. The film is first longitudinally stretched (first direction), and then laterally stretched (second direction) to orient the light-diffusing particles and polyethylene terephthalate to form a substrate and light-diffusing particles dispersed in the substrate. At this time, the formed film is a first optical functional layer, the thickness of the first optical functional layer is 80 μm, a second optical functional layer is coated on a side of the first optical functional layer. The second optical functional layer is an anti-glare sublayer, and the other side of the first optical functional layer is coated with pressure sensitive adhesive as the first adhesive layer. Then, it is laminated with the pre polarizing film (formed by stacking the release layer, second adhesive layer, compensation layer, polarizing layer, and protective layer) in a roll to roll manner to obtain the polarizing film with a structure as shown in FIG. 2.

Example 3

In the same or similar manner as in Example 1, except that the obtained first optical functional layer is subjected to alkali treatment, and water glue is used as the first adhesive layer to directly adhere to the polarizing layer (that is, the protective layer is omitted from the pre-polarizer). The structure of the obtained polarizer is shown in FIG. 3.

Example 4

Same as or similar to Embodiment 1, except that the second optical functional layer is a low-reflection sublayer, the low-reflection sublayer is formed by stacking a transparent hardening sub-portion and a low-refraction sub-portion, and the structure of the obtained polarizer is shown in FIG. 4.

Example 5

Same as or similar to Example 2, except that the master batch is polymethyl methacrylate (refractive index 1.50), the amount of light-diffusing particles added is 5% of the total mass of the solids, the thickness of the first optical functional layer formed after the longitudinal and transverse stretching is 40 μm, and the structure of the obtained polarizer is shown in FIG. 2.

Example 6

Same as or similar to Embodiment 2, except that the first optical functional layer is directly adhered to the polarizing layer (i.e., the protective layer is omitted from the pre-polarizer) by using the ultraviolet adhesive as the first adhesive layer, and the structure of the obtained polarizer is shown in FIG. 5.

Comparative Example 1

Adding rod-shaped calcium carbonate light-diffusing particles, needle-shaped calcium carbonate light-diffusing particles with a reduced diameter at one end, and needle-shaped calcium carbonate light-diffusing particles with a reduced diameter at both ends to a pressure-sensitive adhesive, wherein a mass fraction of the three light-diffusing particles in the light-diffusing particles is 5%, 45%, and 50%, respectively, and the light-diffusing particles after mixing the three light-diffusing particles have a refractive index of 1.67, a long axis of 10-30 μm, and a diameter of 0.5-2 μm, and all the three light-diffusing particles are surface-modified, the surface modifier is stearic acid, and the amount of the light-diffusing particles added is 10% of the total mass of the solids, and coating is performed on the other side surface of the substrate 112 having a low-reflection coating on a side surface (the material is polyethylene terephthalate) to obtain an optical diffusing adhesive layer 113 (the thickness of the optical diffusing adhesive layer is 20 μm), after drying, it is attached to the surface of the protective layer (the material is polyethylene terephthalate) in a roll-to-roll manner. Thus, a polarizer is obtained, and the structure of the obtained polarizer is shown in FIG. 6.

Comparative Example 2

The same as or similar to Example 2, except that the light-diffusing particles are spherical so as to obtain the contrast optical functional layer 114, the structure of the obtained polarizer is shown in FIG. 7.

The first optical functional layer obtained in Examples 1 to 6, the optical diffusion adhesive layer obtained in Comparative Example 1, and the comparative optical functional layer obtained in Comparative Example 2 are photographed by an optical microscope (Olympus MX63L, magnification: 500×(10×50)), and the absolute values of the average values of the orientation angles of the optical diffusion particles with respect to the absorption axis of the polarizing layer in each of the first optical functional layer, the optical diffusion adhesive layer, and the comparative optical functional layer are obtained using the Image J program.

The polarizers obtained in Examples 1 to 6, Comparative Example 1, and Comparative Example 2 are provided on the light-emitting side of the same type of liquid crystal display module (the same liquid crystal display panel, the same backlight module, and the polarizers of the same structure located between the liquid crystal display panel and the backlight module), respectively. Thus, a contrast and a chromaticity viewing angle result of the display device is obtained by using the Japanese KONICA MINOLTA spectrum analyzer CS2000A.

applied to the polarizer, the contrast and brightness of the display device using the polarizer are effectively improved. In addition, compared to the comparative optical functional layer using spherical light-diffusing particles, Examples 1 to 6 adopt rod-shaped light-diffusing particles, needle-shaped light-diffusing particles with reduced diameter at one end, and needle-shaped light-diffusing particles with reduced diameter at both ends. The mixture of particles makes the absolute value of the average value of the orientation angle of the long axis of the light-diffusing particle relative to the absorption axis of the polarizing layer less than or equal to 3.5°, which improves the chromaticity viewing angle even more significantly.

Some embodiments of the present application disclose a polarizer and a display device, the polarizer includes a polarizing layer, a first optical functional layer on a side of the polarizing layer, the first optical functional layer includes a substrate and light-diffusing particles dispersed in the substrate, the substrate has a glass transition temperature ranging from 30° C. to 50° C., the substrate has an elastic modulus ranging from 500 MPa to 5000 MPa at 23° C., The loss of the outgoing lights from the display device is reduced, and the contrast of the display device is improved.

It will be appreciated by those skilled in the art that equivalents may be substituted or altered in accordance with the technical solution of the present application and its

TABLE 1

| | | Substrate | | | Optical Performance | |
| | Master Batch | Average Value Of The Difference Between The Orientation Angles | Thickness (μm) | The Orientation Of The Particles | Contrast | Chromaticity Viewing Angle |
|---|---|---|---|---|---|---|
| Example 1 | TAC | ≤2.3° | 40 | Longitudinally Stretched | 3268 | >160° |
| Example 2 | PET | ≤3.5° | 80 | First Longitudinally Stretched Then Laterally Stretched | 3253 | >160° |
| Example 3 | TAC | ≤2.3° | 40 | Longitudinally Stretched | 3295 | >160° |
| Example 4 | TAC | ≤2.3° | 40 | Longitudinally Stretched | 3290 | >160° |
| Example 5 | PMMA | ≤3.5° | 40 | First Longitudinally Stretched Then Laterally Stretched | 3273 | >160° |
| Example 6 | PET | ≤3.5° | 80 | First Longitudinally Stretched Then Laterally Stretched | 3289 | >160° |
| Comparative Example 1 | Pet | 10° | 80 | Coating | 2980 | >160° |
| Comparative | Pet | / | 80 | First Longitudinally Stretched Then Laterally Stretched | 6374 | 78° |

From the results of Table 1, it can be seen that compared to the optical diffusion adhesive layer formed in pressure-sensitive adhesive, Examples 1 to 6 disperse light-diffusing particles in the base material, and the light-diffusing particles are at least longitudinally stretched along with the formation of the substrate, thereby obtaining the first optical functional layer. After the first optical functional layer is inventive concept, and all such variations or substitutions are intended to fall within the scope of the claims appended hereto.

The invention claimed is:

1. A polarizer, comprising:

a polarizing layer; and a first optical functional layer on a side of the polarizing layer, wherein the first optical functional layer comprises a substrate and light-diffusing particles dispersed in the substrate;

wherein the substrate has a glass transition temperature ranging from 30° C. to 500° C., and the substrate has an elastic modulus ranging from 500 MPa to 5000 MPa at 23° C.; and an orthographic projection of a long axis of each of the light-diffusing particles in a first plane has a first orientation angle, an orthographic projection of an absorption axis of the polarizing layer in the first plane has a second orientation angle, difference between the first orientation angle and the second orientation angle has an average value of less than or equal to 5°, and the first plane is parallel to a plane the polarizing layer disposed, wherein the light-diffusing particles are selected from at least one of a first type of light-diffusing particles, a second type of light-diffusing particles, a third type of light-diffusing particles, a fourth type of light-diffusing particles, and a fifth type of light-diffusing particles;

wherein a variation value of a diameter of each of the first type of light-diffusing particles along an extension direction of a long axis of the first type of light-diffusing particle is less than or equal to 0.3 μm;

a variation value of a diameter of a middle portion of each of the second type of light-diffusing particles is less than or equal to 1 μm along an extension direction of a long axis of the second type of light-diffusing particle, and a variation value of a diameter of a first end of the second type of light-diffusing particle is less than or equal to 1 μm in a direction away from the middle portion of the second type of light-diffusing particle;

a variation value of a diameter of a middle portion of each of the third type of light-diffusing particles is less than or equal to 1 μm along an extension direction of a long axis of the third type of light-diffusing particle, and a diameter of a first end of the third type of light-diffusing particle gradually decreases and a diameter of a second end of the third type of light-diffusing particle gradually decreases in a direction away from the middle portion of the third type of light-diffusing particle;

a first end of each of the fourth type of light-diffusing particles is sequentially connected to a second end of the fourth type of light-diffusing particle, and a diameter of the fourth type of light-diffusing particle gradually decreases in a direction from the first end to the second end of the fourth type of light-diffusing particle;

a first end of each of the fifth type of light-diffusing particles is sequentially connected to a second end of the fifth type of light-diffusing particle, a diameter of the first end of the fifth type of light-diffusing particle gradually decreases in a direction away from the second end of the fifth type of light-diffusing particle, and a diameter of the second end of the fifth type of light-diffusing particle gradually decreases in a direction away from the first end of the fifth type of light-diffusing particle.

2. The polarizer of claim 1, wherein an included angle is defined between the long axis of the light-diffusing particle and the first plane, and the included angle is an acute angle less than or equal to 40°.

3. The polarizer of claim 1, wherein the first type of light-diffusing particles are rod-shaped particles, the second type of light-diffusing particles are needle-shaped particles with a reduced diameter at one end, the third type of light-diffusing particles are needle-shaped particles with a reduced diameter at both ends, the fourth type of light-diffusing particles are long cone-shaped particles, and the fifth type of light-diffusing particles are bicone-shaped particles.

4. The polarizer of claim 1, wherein the light-diffusing particles are selected from at least two of the first type of light-diffusing particles, the second type of light-diffusing particles, the third type of light-diffusing particles, the fourth type of light-diffusing particles, and the fifth type of light-diffusing particles.

5. The polarizer of claim 4, wherein the light-diffusing particles are selected from the first type of light-diffusing particles, the second type of light-diffusing particles, and the third type of light-diffusing particles.

6. The polarizer of claim 4, wherein the light-diffusing particles are selected from the first type of light-diffusing particles, the fourth type of light-diffusing particles, and the fifth type of light-diffusing particles.

7. The polarizer of claim 4, wherein the light-diffusing particles are selected from the first type of light-diffusing particles, the second type of light-diffusing particles, the third type of light-diffusing particles, the fourth type of light-diffusing particles, and the fifth type of light-diffusing particles.

8. The polarizer of claim 7, wherein a mass fraction of the first type of light-diffusing particles in the light-diffusing particles ranges from 1% to 8%, a mass fraction of the second type of light-diffusing particles and the fourth type of light-diffusing particles in the light-diffusing particles ranges from 40% to 50%, and a mass fraction of the third type of light-diffusing particles and the fifth type of light-diffusing particles in the light-diffusing particles ranges from 45% to 55%.

9. The polarizer of claim 1, wherein material of the substrate is selected from at least one of triacetyl cellulose, polyethylene terephthalate, polycarbonate, polymethyl methacrylate, polycyclic olefin, and polyethylene naphthalate two formic acid glycol ester.

10. The polarizer of claim 9, wherein the material of the substrate is selected from triacetyl cellulose;

wherein the difference between the first orientation angle and the second orientation angle has the average value of less than or equal to 2.3°.

11. The polarizer of claim 9, wherein the material of the substrate is selected from polyethylene terephthalate or polymethyl methacrylate;

wherein the difference between the first orientation angle and the second orientation angle has the average value of less than or equal to 3.5°.

12. The polarizer of claim 1, wherein a ratio of the long axis of the light-diffusing particle to a diameter of the light-diffusing particle is greater than or equal to 1, and the ratio of the long axis of the light-diffusing particle to the diameter of the light-diffusing particle is less than or equal to 100.

13. The polarizer of claim 12, wherein the long axis of the light-diffusing particle is greater than or equal to 5 μm, and the long axis of the light-diffusing particle is less than or equal to 50 μm.

14. The polarizer of claim 1, wherein surfaces of the light-diffusing particles comprise at least one of inorganic cationic groups, inorganic anionic groups, polymeric groups, coupling agent groups, or surfactant groups.

15. The polarizer of claim 1, wherein a mass fraction of the light-diffusing particles in the first optical functional layer is greater than or equal to 3%, and the mass fraction of the light-diffusing particles in the first optical functional layer is less than or equal to 30%.

16. The polarizer of claim 1, wherein an absolute value of difference between refractive index of the substrate and refractive index of the light-diffusing particle is greater than or equal to 0.02.

17. The polarizer of claim 1, wherein the polarizer comprises a second optical functional layer on at least one side of the substrate, the second optical functional layer comprises at least one of an anti-glare sublayer, a transparent hardening sublayer, a low reflection sublayer, an anti-reflection sublayer, an anti-fingerprint sublayer, and an anti-static sublayer;

wherein the second optical functional layer is disposed between the polarizing layer and the first optical functional layer; or the second optical functional layer is disposed on a side of the first optical functional layer away from the polarizing layer.

18. The polarizer of claim 1, wherein a thickness of the first optical functional layer is greater than or equal to 15 μm, and the thickness of the first optical functional layer is less than or equal to 150 μm.

19. A display device, comprising a polarizer, wherein the polarizer comprises:

a polarizing layer;

a first optical functional layer on a side of the polarizing layer, the first optical functional layer comprises a substrate and light-diffusing particles dispersed in a substrate;

wherein the substrate has a glass transition temperature ranging from 30° C. to 500° C., and the substrate has an elastic modulus ranging from 500 MPa to 5000 MPa at 23° C.;

an orthographic projection of a long axis of the light-diffusing particle in a first plane has a first orientation angle, an orthographic projection of an absorption axis of the polarizing layer in the first plane has a second orientation angle, the difference between the first orientation angle and the second orientation angle has an average value of less than or equal to 5°, and the first plane is parallel to the plane in which the polarizing layer is located, wherein the light-diffusing particles are selected from at least one of a first type of light-diffusing particles, a second type of light-diffusing particles, a third type of light-diffusing particles, a fourth type of light-diffusing particles, and a fifth type of light-diffusing particles;

wherein a variation value of a diameter of each of the first type of light-diffusing particles along an extension direction of a long axis of the first type of light-diffusing particle is less than or equal to 0.3 μm;

a variation value of a diameter of a middle portion of each of the second type of light-diffusing particles is less than or equal to 1 μm along an extension direction of a long axis of the second type of light-diffusing particle, and a variation value of a diameter of a first end of the second type of light-diffusing particle is less than or equal to 1 μm in a direction away from the middle portion of the second type of light-diffusing particle;

a variation value of a diameter of a middle portion of each of the third type of light-diffusing particles is less than or equal to 1 μm along an extension direction of a long axis of the third type of light-diffusing particle, and a diameter of a first end of the third type of light-diffusing particle gradually decreases and a diameter of a second end of the third type of light-diffusing particle gradually decreases in a direction away from the middle portion of the third type of light-diffusing particle;

a first end of each of the fourth type of light-diffusing particles is sequentially connected to a second end of the fourth type of light-diffusing particle, and a diameter of the fourth type of light-diffusing particle gradually decreases in a direction from the first end to the second end of the fourth type of light-diffusing particle;

a first end of each of the fifth type of light-diffusing particles is sequentially connected to a second end of the fifth type of light-diffusing particle, a diameter of the first end of the fifth type of light-diffusing particle gradually decreases in a direction away from the second end of the fifth type of light-diffusing particle, and a diameter of the second end of the fifth type of light-diffusing particle gradually decreases in a direction away from the first end of the fifth type of light-diffusing particle.

\* \* \* \* \*